United States Patent
Aoki et al.

[19]

[11] Patent Number: 5,868,517
[45] Date of Patent: *Feb. 9, 1999

[54] SPLINE ARRANGEMENT FOR SHAFT COUPLING STRUCTURE

[75] Inventors: Hidekazu Aoki; Toshio Ishibashi, both of Atsugi, Japan

[73] Assignee: Unisia Jecs Corporation, Atsugi, Japan

[*] Notice: This patent issued on a continued prosecution application filed under 37 CFR 1.53(d), and is subject to the twenty year patent term provisions of 35 U.S.C. 154(a)(2).

[21] Appl. No.: 599,593

[22] Filed: Feb. 9, 1996

[30] Foreign Application Priority Data

Feb. 28, 1995 [JP] Japan .................................. 7-039961

[51] Int. Cl.⁶ ...................................................... B25G 3/28
[52] U.S. Cl. ............................ 403/359; 403/221; 403/32; 464/180; 464/182
[58] Field of Search ............................. 403/359, 32, 221, 403/220; 464/180, 182, 183, 16

[56] References Cited

U.S. PATENT DOCUMENTS

| | | |
|---|---|---|
| Re. 33,322 | 9/1990 | Sills et al. ............................. 403/359 X |
| 1,541,007 | 6/1925 | Thiemer ................................. 403/359 X |
| 1,808,798 | 6/1931 | Urschel . | |
| 2,691,283 | 10/1954 | Stover .................................. 464/180 X |
| 2,857,974 | 10/1958 | Heller ....................................... 180/70 |
| 3,234,758 | 2/1966 | Lewis . | |
| 4,020,651 | 5/1977 | Callies ................................... 464/91 X |
| 4,131,375 | 12/1978 | Fisher ................................... 403/359 X |
| 4,142,807 | 3/1979 | Fisher et al. ......................... 403/359 X |
| 4,279,275 | 7/1981 | Stanwood et al. .................. 403/359 X |
| 4,551,115 | 11/1985 | Ferguson ............................... 464/180 X |
| 4,614,506 | 9/1986 | Sakata .................................. 403/359 X |
| 4,667,530 | 5/1987 | Mettler et al. ...................... 403/359 X |

FOREIGN PATENT DOCUMENTS

| | | |
|---|---|---|
| 386 873 B | 3/1988 | Austria . |
| 27 39 686 C2 | 3/1978 | Germany . |
| 28 49 541 A1 | 5/1980 | Germany . |
| 1190165 | 4/1970 | United Kingdom ............... 403/359 |
| 2 042 126 | 9/1980 | United Kingdom . |

OTHER PUBLICATIONS

"Mazda Titan Service Manual", published (1980).

*Primary Examiner*—Joanne Silbermann
*Assistant Examiner*—William L. Miller
*Attorney, Agent, or Firm*—Foley & Lardner

[57] ABSTRACT

A shaft coupling structure for male and female shaft components of a vehicular propeller shaft includes a sleeve shaft having a substantially rigid first end, an annular flange formed therearound at a central location at which the sleeve shaft connects to a tube member, and a reduced diameter portion which extends from the flange into the tube portion. A plurality of splines are formed in the axial direction of the sleeve shaft and are interposed between an inner wall of the rigid first end and a stub yoke which is inserted into the first end for co-rotation therewith. Further, a grease cap, or other lubrication device may be provided at an end of the reduced diameter portion. Also, around the reduced diameter portion, between the inner wall of the tube and the outer side of the reduced diameter portion, a vibration damping device, as well as an insertion guide device may be provided for improving smoothness and reducing operational noise for the shaft coupling structure.

8 Claims, 5 Drawing Sheets

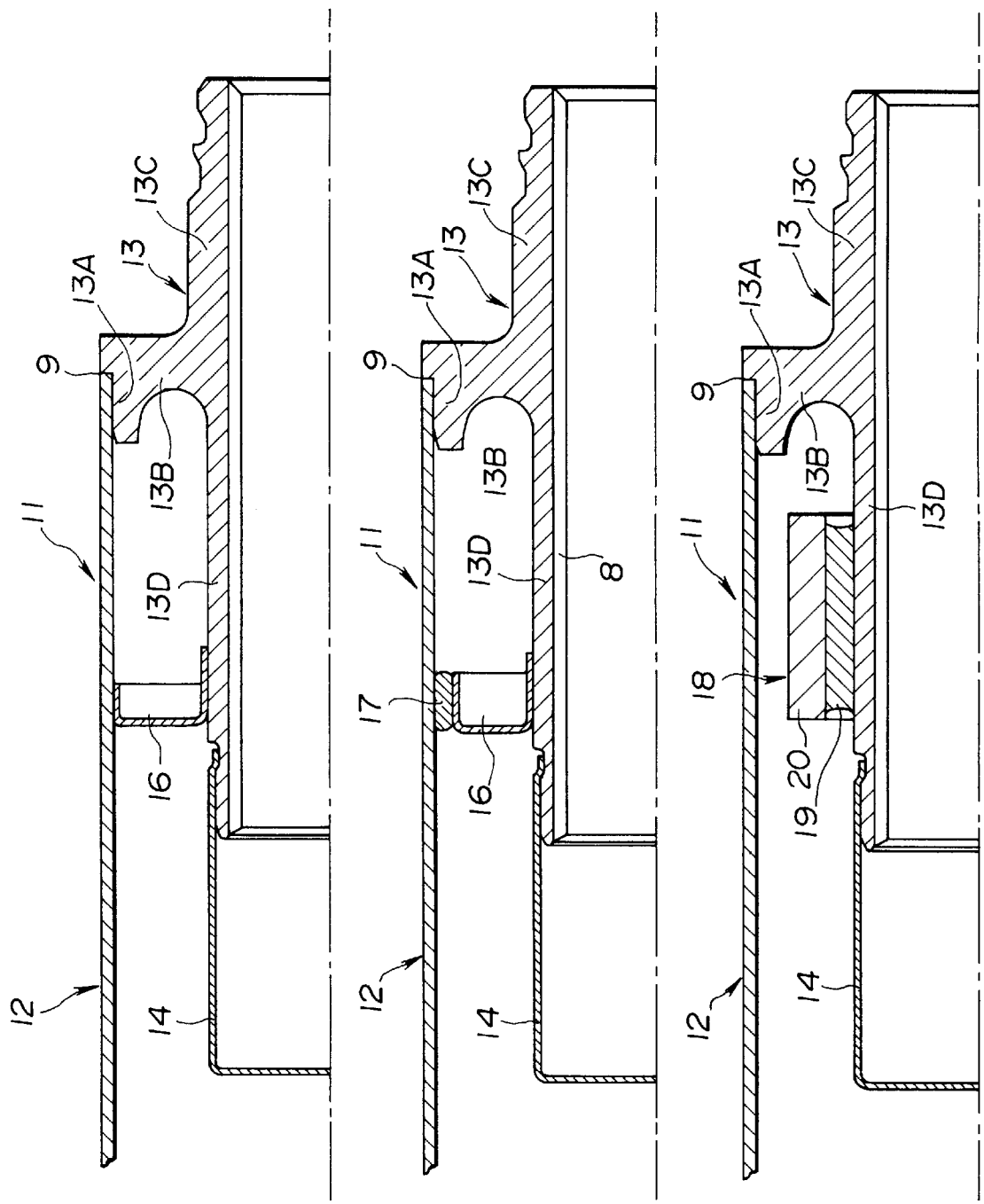

5,868,517

SPLINE ARRANGEMENT FOR SHAFT COUPLING STRUCTURE

FIELD OF THE INVENTION

The present invention relates to a shaft coupling structure. Specifically, the present invention relates to a spline arrangment for axially joining rotatable shaft members such as drive shaft members of an automotive vehicle, or the like.

DESCRIPTION OF THE RELATED ART

Generally, a propeller shaft, or drive shaft, of an automotive vehicle transmits rotational force from an output shaft of a automotive transmission, to the input shaft of a differential gear for supplying rotational force to the road wheels. In so-called FR (front engine/rear drive) vehicles, a drive shaft is connected between to universal joints, one at the input, or transmission side and one at the output, or differential side. Commonly, such a propeller shaft includes a sleeve shaft member (i.e. male shaft member) and a tube member (i.e. female shaft member) wherein the outer surface of the shaft and the inner surface of the tube are connected by a spline. According to this structure a sliding connection may be achieved and the vehicle drive shaft is able to comepensate for changes in a length of the drive line during vehicle operation.

One such method of splining a driving shaft of a vehicle utilizing a so called integral shaft is disclosed in FIGS. 8–14 of Mazda Titan Service Manual 80–10, published October 1980. FIGS. 5(A)–5(B) are explanatory cross-sectional views for explaining such a conventional splining arrangement.

Referring to FIGS. 5(A), 5(B), it may be seen that a propeller shaft 1 includes a tube shaft 2 at one end and a sleeve shaft 3 at the other end thereof. The tube shaft 2 is attached to a yoke flange 4 of a universal joint 5 and the sleeve shaft 3 is engaged with a stub yoke 6 of a universal joint 7. At the stub yoke 6, along the inner circumferential surface of the sleeve shaft 3, a spline 8 is inserted. Referring now to FIG. 5(B), it may further be seen that, for making attachment between the tube shaft 2 and the sleeve shaft 3, one end of the sleeve shaft 3 is flange-shaped end where it connects to the tube shaft 2. The flange end of the sleeve shaft includes an annular end surface 3a which is inserted into the connecting end of the tube shaft to contact the inner annular surface 2a of the tube shaft 2. An annular lip 9 defines the limit of the annular end surface 3a of the sleeve shaft 3 and generally, welding is performed at this location for integrally joining the tube and sleeve shafts 2, 3.

According to this structure, wherein rotational force is transmitted from the stub yoke 6 to the sleeve shaft 3 and then to the inner side of the tube shaft 2 via the spine arrangement 8, a given mechanical strength, length and thickness of the sleeve shaft is required and may not be reduced. Further, reducing the overall weight of the drive shaft structure is not facilitated. Also, the length of the drive shaft 1 cannot be varied since the length of the tube shaft from the end which engages the sleeve shaft to the opposing end is fixed according to the point of engagement between the shafts 2, 3. However, since the overall rigidity of the drive shaft 1 must be kept high, allowing for a substantially high maximum rotational speed of the vehicle to be accomodated, if for example, a drive shaft structure is utilized having a tube shaft with a relatively large diameter, an overall length of the tube shaft should be limited accordingly to maintain optimal operational rigidity.

Thus it has been required to provide a drive shaft structure which can reliably acheive high maximum rotational speeds with sufficient rigidity while allowing a construction which is substantially light in weight and low in cost.

SUMMARY OF THE INVENTION

Thus, it is an object of the present invention to overcome the drawbacks of the related art.

It is a further object of the invention to provide a drive shaft structure which can operate at high maximum rotational speeds with sufficient rigidity while having a construction which is lightweight and low in cost while also reducing operational noise.

According to one aspect of the invention, there is provided a shaft coupling structure, comprising: a sleeve shaft having a flange formed therealong at a location where the sleeve shaft is connected to a tube shaft; the flange being interposed between a first end of the sleeve shaft coupling with the tube shaft and a second end of the sleeve shaft coupling with a stub yoke for co rotation therewith; the stub yoke being inserted into the end of the sleeve shaft to be engaged therewith via a plurality of splines formed in the axial direction of the sleeve shaft and the stub yoke; wherein the flange is formed on the sleeve shaft at a location substantially corresponding to a longitudinal center of the splines.

BRIEF DESCRIPTION OF THE DRAWINGS

FIGS. 3(A), (B) and (C) are enlarged cross-sectional views of a coupling point between the shafts according to alternative structures based on a second preferred embodiment of the invention;

DESCRIPTION OF THE PREFERRED EMBODIMENT

Figure 1A:
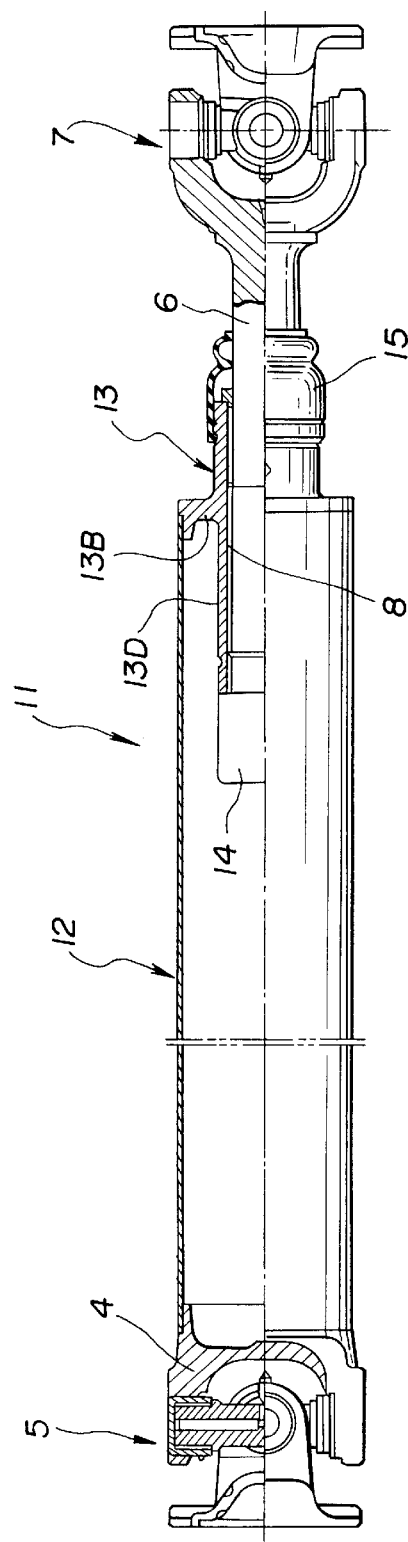
FIGS. 1(A) and (B) are cross-sectional views of a shaft coupling structure according to a preferred embodiment of the invention.
Figure 1B:
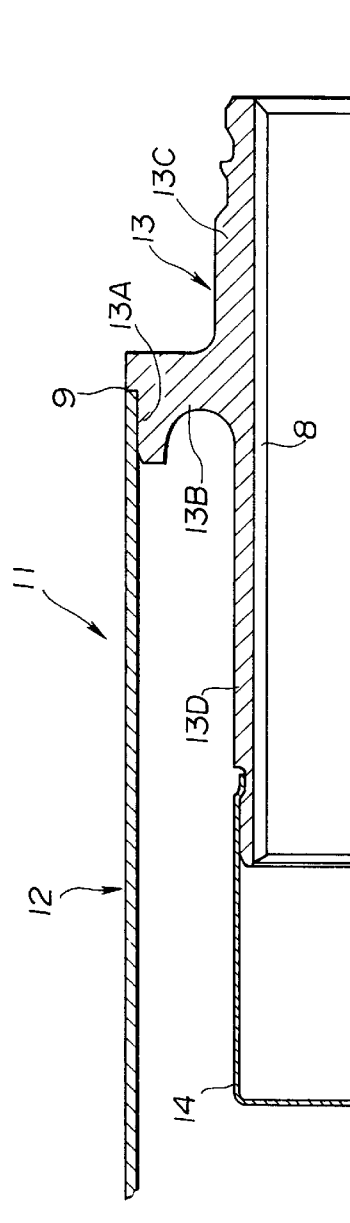
FIG. 1(B) shows an enlarged view of structural detail at a coupling point between a sleeve shaft and a tube shaft (i.e. male and female shaft members)
Figure 5A:
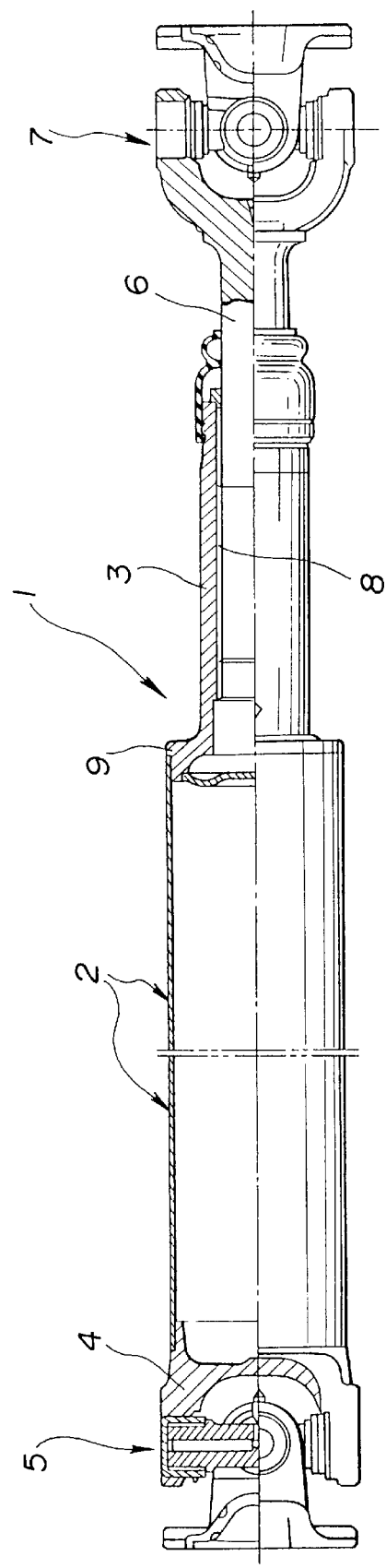
FIGS. 5 (A) and 5(B) are cross-sectional views of a conventional shaft coupling structure for a drive shaft of an automotive vehicle, FIG. 5(B) showing an enlarged view of a coupling point between a sleeve shaft and a tube shaft (i.e. male and female shaft members).
Figure 5B:
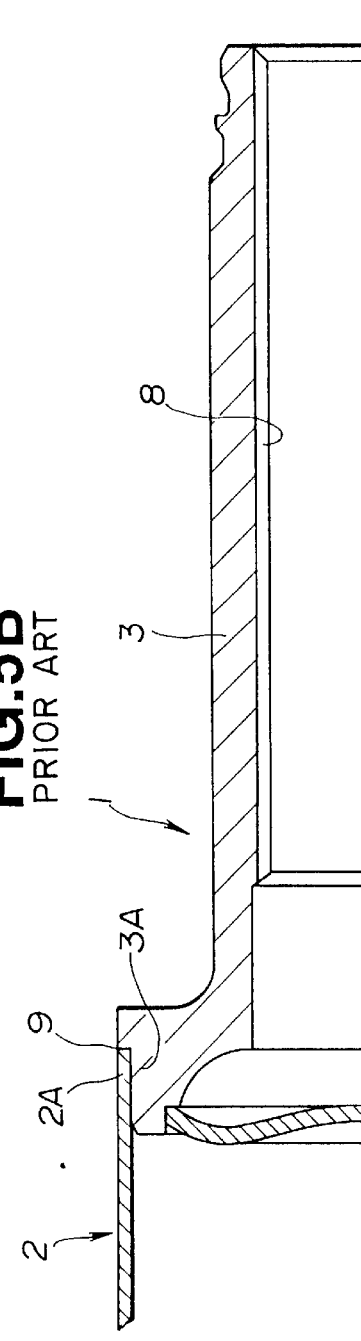

Herein below, a preferred embodiment of the invention will be explained in detail with reference to the drawings. Referring to FIGS. 1(A), 1(B), in a propeller shaft 11 according to the invention, it can be seen that a distance between the first and second universal joints 5, 7 is the same as that of FIGS. 5(A), (B). However, according to the present embodiment, the length of a tube shaft 12 is shorter than the above-described conventional structure. Also, it may be seen that the structure of the sleeve shaft 13 of the invention differs from that of the known structure.

As may be seen the sleeve shaft 13 includes a projected flange portion 13B for making attachment between the tube shaft 12 and the sleeve shaft 13. The flange portion 13B of the sleeve shaft 13 defines an annular outer surface 13A which is inserted into the connecting end of the tube shaft 12 to contact an inner annular surface of the tube shaft 12. An annular lip 9 defines the limit of the annular end surface 13A of the flange portion 13A of the sleeve shaft 13. Further, the sleeve shaft structure includes a thick end 13C where the sleeve shaft engages the universal joint 7, and the portion of the sleeve shaft 13 extending from the flange portion 13B in the direction of the universal joint 5 is formed as a reduced thickness portion 13D. At a distal end of the reduced thickness portion 13D, a so-called grease cap 14, or the like is disposed for storing lubricant (i.e. grease) for the shaft coupling structure. Then, at the opposite end 13C of the sleeve shaft, a stub yoke 6 of the universal joint 7 is inserted to the interior space of the sleeve shaft 13 such that an outer circumferential surface of the stub yoke 6 engages the inner surface of the sleeve shaft via interlocking splines 8 for co-rotation therewith, and for allowing sliding adjustment of the overall length of the propeller shaft 11. It will be noted that the flange portion 13B of the sleeve shaft is formed at substantially a center position in relation to the splines 8. According to the present embodiment, an annular seal 15, formed of rubber or other resilient material, is fitted over the thick end 13C of the sleeve shaft where the end thereof is engaged by the stub yoke. According to this structure, smooth axial movement of the stub yoke 6 relative the sleeve shaft 13 may be accomplished according to the provision of the grease cap 14 while firm engagement and prevention of lubricant leakage is effected by the seal 15. Further, according to the structure of the invention, an overall thickness, and thus weight, of the sleeve shaft 13 can be reduced while quiet operation is promoted.

The reasons for establishing the shaft coupling structure of the invention in this manner will be set forth below.

As may be seen, the structure of the invention is set up such that the location of the engaging surface 13A of the flange portion 13B for engaging the connecting end of the tube shaft 12 is positioned to correspond substantially to a middle portion of the length of the splines 8. That is generally, according to sliding of the splines 8 torque transmission becomes relatively small, for example, in running conditions such as when the vehicle runs over rough terrain. However, according to the present invention, the stub yoke 6 is inserted through the thick end 13C of the sleeve shaft, through the center opening of the flange portion 13B and past the annular surface 13A and into the reduced diameter portion supported within the internal space of the tube shaft 12. According to this, a longitudinal center area of the spline 8 is positioned under the largest structural component of the structure, the flange portion 13B of the sleeve shaft. Torque transmission from the stub yoke 6 to the propeller shaft 11 is enhanced since torque is transmitted from the stub yoke 6 to the relatively rigid thick end 13C of the sleeve shaft and from the thick end 13C to the large component, that is the flange portion 13B, and then from the flange portion 13B to the tube shaft 12. According to this, a thickess of the other end of the sleeve shaft 13, that is, the reduced thickness portion 13D, need only be made thick enough for effecting support of the stub yoke 6 and need not be of high rigidity since it is not utilized for torque transmission even according to sliding adjustment of the spline 8 during vehicle running operation.

According to this structure, highly rigid components are engaged for effecting efficient torque transmission while and overall weight and cost of the sleeve shaft may be reduced. Further, according to the structure of the invention, the length of the tube shaft may be limited (i.e. shortened) while overall rigidity and performance of the propeller shaft are maintained high.

In addition, substantially high maximum rotational speed f may be obtained by a propeller shaft 11 according to the invention as will be explained herein below with reference to the following formulae;

$$A \text{ maximum rotational speed } f = \tfrac{1}{2}\pi\sqrt{K/m} \qquad (1)$$

wherein K=rigidity coefficient and m=mass.
According to formula (1), $$I = (d_1^4 - d_2^4)\pi/64 \qquad (2)$$

wherein: d1=tube shaft outer circumference and
d2=tube shaft inner circumference.

The structure of the invention, by the length of the propeller shaft 11 and the relatively large circumferential dimension of the tube 12 provides high rigidity and mechanical strength and, in addition, higher maximum rotational speeds may be safely and reliably achieved.

Figure 2A:
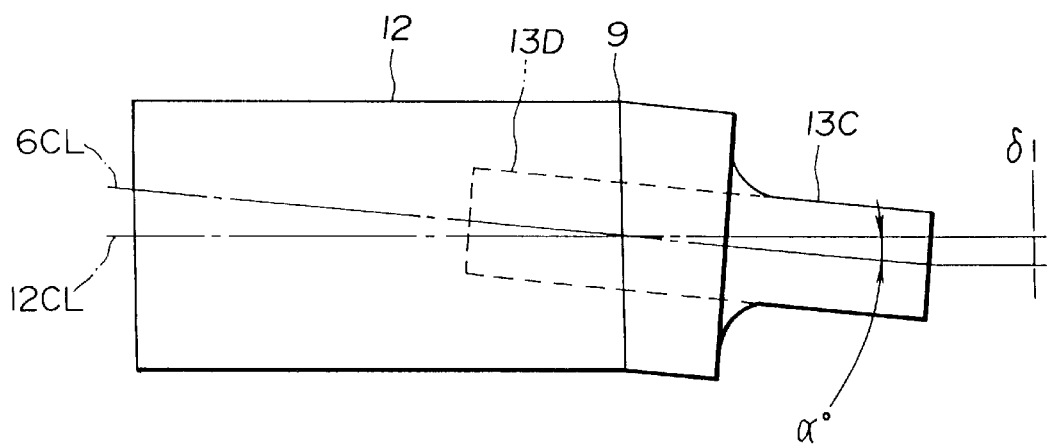
FIGS. 2(A) and (B) are diagrams comparing behavior of the sleeve shaft of the invention with a conventional sleeve shaft when the drive shaft is subject to shaking or vibration.
Figure 2B:
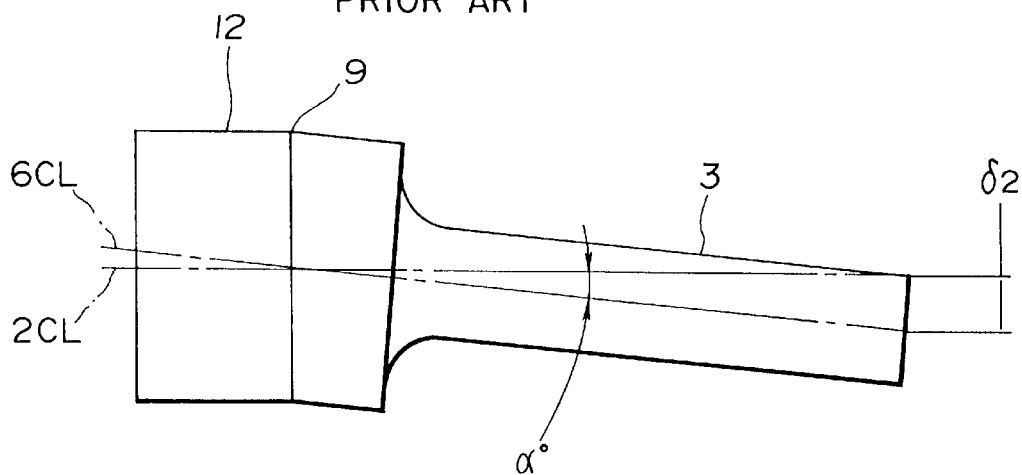

Further, referring to FIG. 2, 6CL and 2CL respectively indicate the rotational axes of the sleeve shaft of the invention and the of the prior art, it will be noted that, if there should there be deviation of an angle $\alpha°$ of the sleeve shaft 6 in relation to the tube 12 in the vicinity of the spline portion 8 and connecting portion 9, due to inaccurate assembly or damage for example, a degree of eccentricity $\delta$ of the rotational axis 12CL according to the invention (A) is kept smaller as compared with the prior art(B). That is, $\delta 1 < \delta 2$ according to the invention This feature is effective for reducing unbalanced rotation at a time when rotational movement of the propeller shaft 11 is initiated.

Next, alternative structures of a propeller shaft according to the invention will be described herein below in detail with reference to FIGS. 3(A)–(C) and FIG. 4. As may be seen in the drawings, the propeller shaft 11 according to the invention may include an annular insertion guide portion 16 disposed around the reduced thickness portion between the inner wall of the tube 12 and the outer wall of the reduced thickness portion 13D for acting as a vibration damper. Alternatively, as seen in FIG. 3(B) the insertion guide 16 may be disposed around the reduced thickness portion 13D and an annular resilient member 17 which is disposed against the inner wall of the tube 12 may be interposed between the pressure guide and the tube 12. Further, as seen in FIG. 3(C) a damper 18 may be provided comprising a ring member 20 disposed around a resilient member 19 which is fitted around the outer wall of the reduced thickness portion 13D of the sleeve shaft. These structures favorably contribute to vibration control in the entire propeller shaft 11 structure overall.

Figure 4:
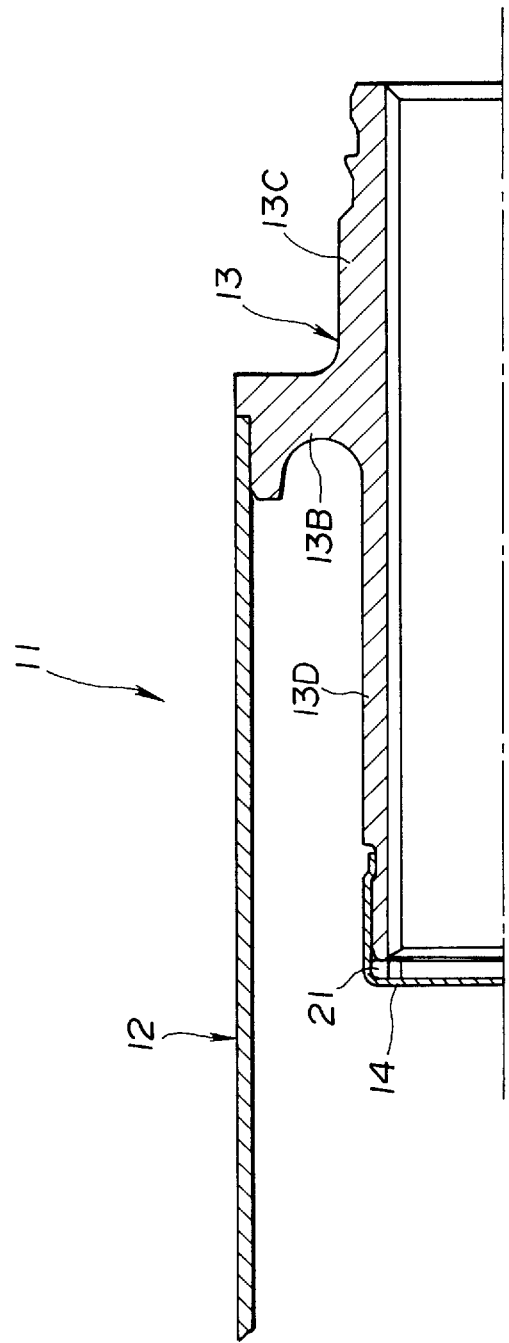
FIG. 4 is an enlarged cross-sectional view of a third preferred embodiment of a shaft coupling structure according to the invention.

Also, as seen in FIG. 4, an annular seal 21 may be provided between an end of the sleeve shaft 13 and the grease cap 14. According to this, a size of the grease cap may be reduced and lubricating performance may be improved even if a smaller grease cap 14 is utilized.

Thus, according to the present invention as described herein above, there is provided a drive shaft structure which can operate at substantially higher maximum rotational speeds with sufficient rigidity and stability.

Further, according to the structure of the invention as herein set forth, a drive shaft structure is achieved which is light in weight and low in cost while also reducing operational noise.

It will be noted that the preferred embodiment of the invention is set forth in terms of a shaft coupling structure for a propeller shaft of an automotive vehicle. However, the present invention may be embodied in various different ways without departing from the principle of the invention as herein set forth.

The present invention in not limited only to the description as herein disclosed but may be modified and embodied in other ways without departing from the scope or inventive concept of the invention as set forth above.

What is claimed is:

1. A shaft coupling structure, comprising:
   a stub yoke rotatable about a stub yoke axis, the stub yoke being formed with an outer spline;
   a tube shaft rotatable about a tube shaft axis; and
   a sleeve shaft having an inner spline extending from an inner end thereof, the sleeve shaft receiving therein the stub yoke with the inner spline of the sleeve shaft mating with the outer spline of the stub yoke, the sleeve shaft being connected to the tube shaft by a flange and having a first portion on a side of the flange adjacent an insertion point of the stub yoke, and a second portion on another side of the flange spaced from an insertion point of the stub yoke, the second section having a thickness which is less than a thickness of the first section,
   wherein the sleeve shaft and the stub yoke are inserted into the tube shaft adjacent a connecting section of the tube shaft where the flange is connected to the tube shaft,
   wherein the inner spline of the sleeve shaft is divided into a first inner spline section and a second inner spline section where the flag is connected to the sleeve shaft, and the outer spline of the stub yoke is divided into a first outer spline section and a second outer spline section adjacent where the flange is connected to the sleeve shaft, and wherein the first inner spline section and the first outer spline section are disposed at an exterior of the tube shaft, and the second inner spline section and the second outer spline section are disposed inside the tube shaft.

2. A shaft coupling structure as claimed in claim 1, wherein the sleeve shaft has a reduced diameter at the second inner spline section.

3. A shaft coupling structure as claimed in claim 2, further including a grease cap fitted over the sleeve shaft at the second inner spline section.

4. A shaft coupling structure as claimed in claim 3, further including an annular seal fitted over the sleeve shaft at the first inner spline section.

5. A shaft coupling structure as claimed in claim 4, further including an annular insertion guide disposed between the second inner spline section of the sleeve shaft and the tube shaft.

6. A shaft coupling structure as claimed in claim 4, further including a damper fitted around the sleeve shaft at the second inner spline section.

7. A shaft coupling structure, comprising:
   a stub yoke rotatable about a stub yoke axis, the stub yoke being formed with an outer spline;
   a tube shaft rotatable about a tube shaft axis; and
   a sleeve shaft having an inner spline extending from an inner end thereof, the sleeve shaft receiving therein the stub yoke with the inner saline of the sleeve shaft mating with the outer spline of the stub yoke, the sleeve shaft being connected to the tube shaft by a flange;
   wherein the sleeve shaft and the stub yoke are inserted into the tube shaft adjacent a connecting section of the tube shaft where the flange is connected to the tube shaft, and
   wherein the inner spline of the sleeve shaft is divided into a first inner spline section and a second inner spline section where the flange is connected to the sleeve shaft, the second inner saline section having a reduced diameter, and the outer spline of the stub yoke is divided into a first outer spline section and a second outer spline section adjacent where the flange is connected to the sleeve shaft, and the first inner spline section and the first outer spline section are disposed at an exterior of the tube shaft, and the second inner spline section and the second outer spline section are disposed inside the tube shaft, the structure further comprising:
   a grease cap is fitted over the sleeve shaft at the second inner spline section;
   an annular seal fitted over the sleeve shaft at the first inner spline section;
   an annular insertion guide disposed between the second inner spline section of the sleeve shaft and the tube shaft; and
   an annular resilient member disposed between the annular insertion guide and the tube shaft.

8. A shaft coupling structure, comprising:
   a stub yoke rotatable about a stub yoke axis, the stub yoke being formed with an outer spline;
   a tube shaft rotatable about a tube shaft axis; and
   a sleeve shaft having an inner spline extending from an inner end thereof, the sleeve shaft receiving therein the stub yoke with the inner spline of the sleeve shaft mating with the outer spline of the stub yoke, the sleeve shaft being connected to the tube shaft by a flange;
   wherein the sleeve shaft and the stub yoke are inserted into the tube shaft adjacent a connecting section of the tube shaft where the flange is connected to the tube shaft, and
   wherein the inner spline of the sleeve shaft is divided into a first inner spline section and a second inner spline section where the flange is connected to the sleeve shaft, the second inner spline section having a reduced diameter, and the outer spline of the stub yoke is divides into a first outer spline section and a second outer spline section adjacent where the flange is connected to the sleeve shaft, and the first inner spline section and the first outer spline section are disposed at an exterior of the tube shaft, and the second inner spline section and the second outer spline section are disposed inside the tube shaft, the structure further comprising:
   a grease cap is fitted over the sleeve shaft at the second inner spline section;
   an annular seal fitted over the sleeve shaft at the first inner spline section; and
   a damper fitted around the sleeve shaft at the second inner spline section and comprising a resilient member fitted around the sleeve shaft at the second inner spline section and a ring member disposed around the resilien; member.

* * * * *